Figure 3:
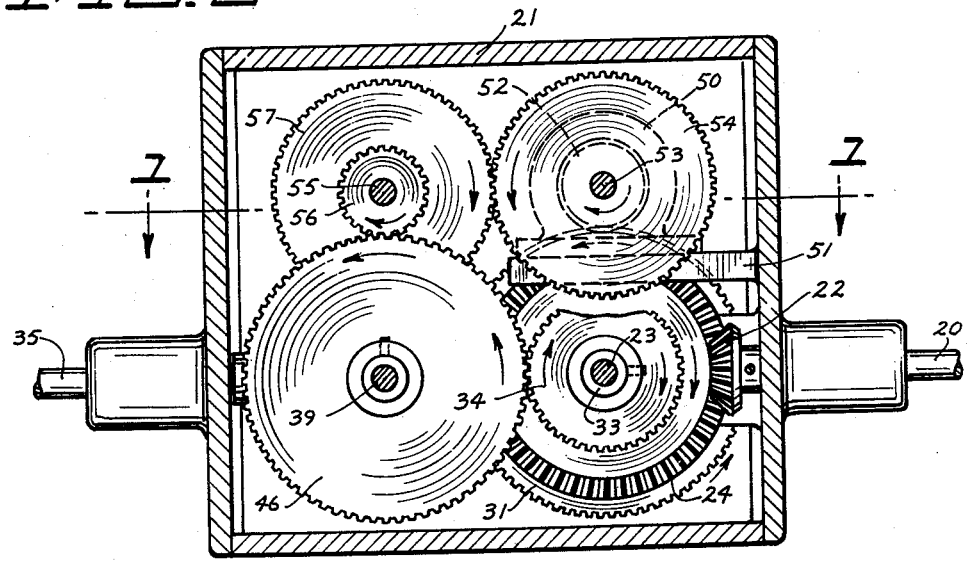

Jan. 28, 1964 D. D. RAZE 3,119,282
VARIABLE SPEED POWER TRANSMISSION
Original Filed April 5, 1956 3 Sheets-Sheet 1
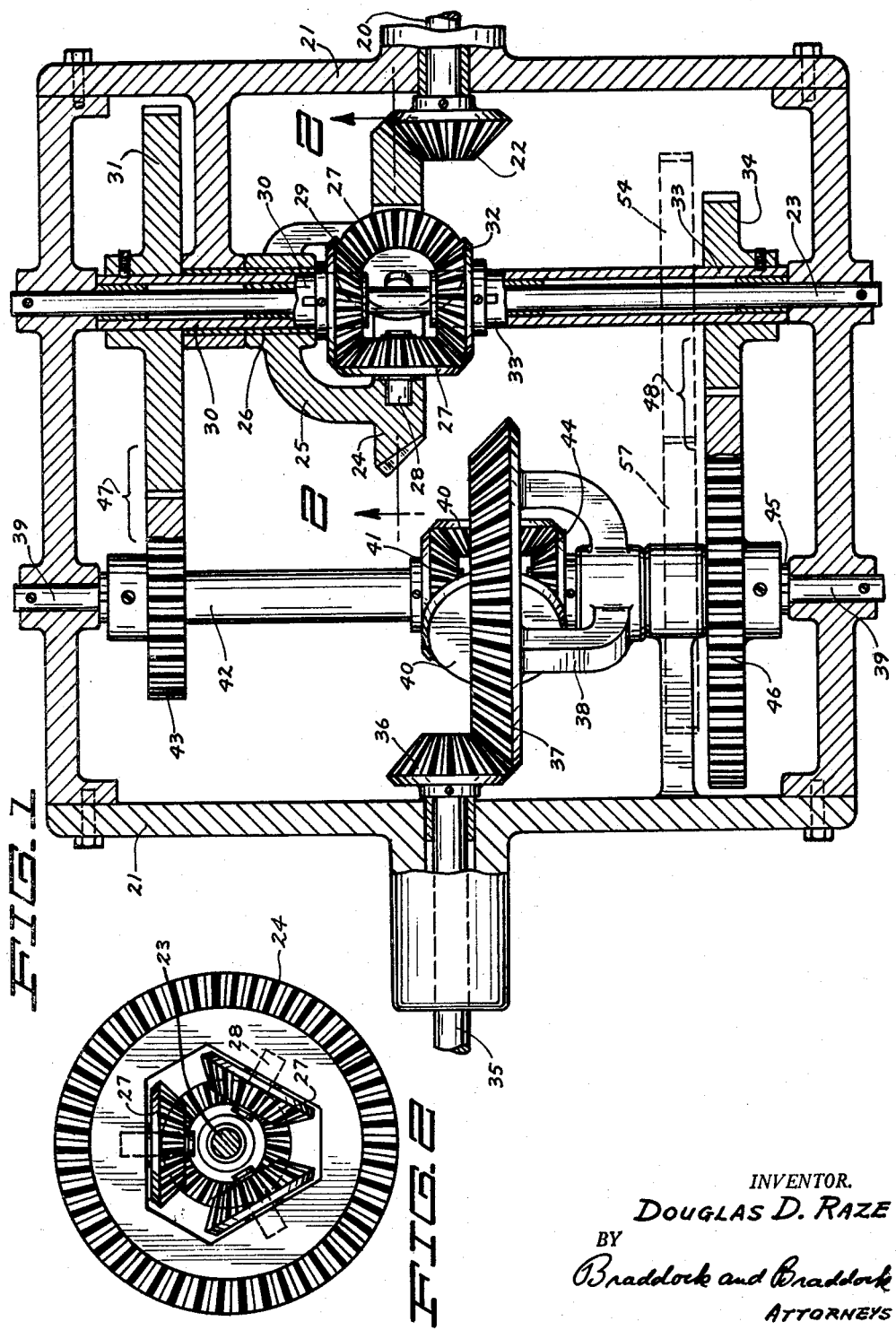
INVENTOR.
DOUGLAS D. RAZE
BY
Braddock and Braddock
ATTORNEYS Jan. 28, 1964 D. D. RAZE 3,119,282
VARIABLE SPEED POWER TRANSMISSION
Original Filed April 5, 1956 3 Sheets-Sheet 2

INVENTOR.
DOUGLAS D. RAZE
BY
Braddock and Braddock
ATTORNEYS

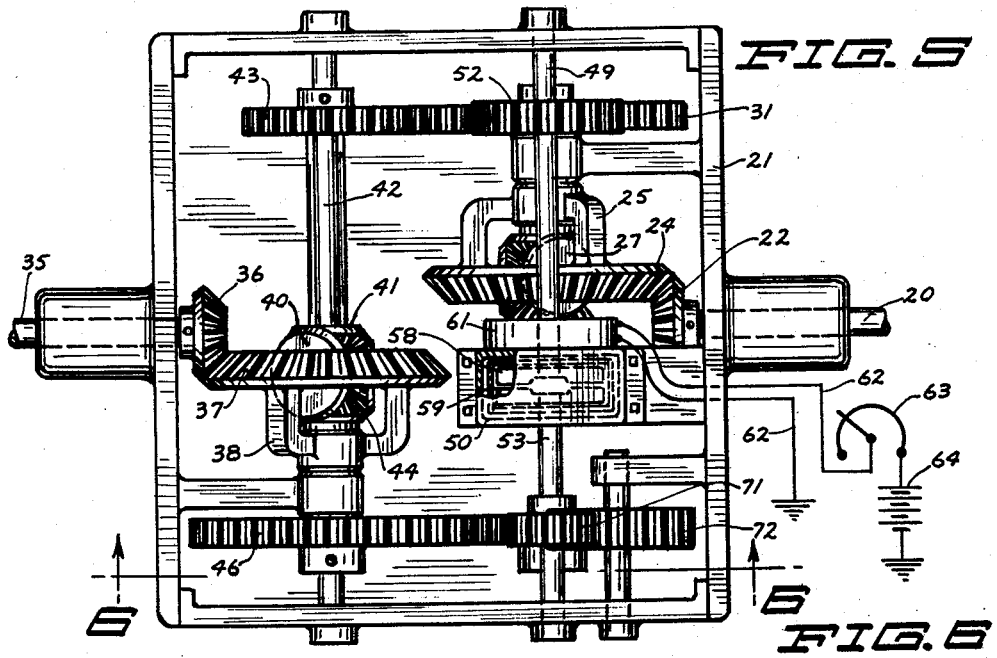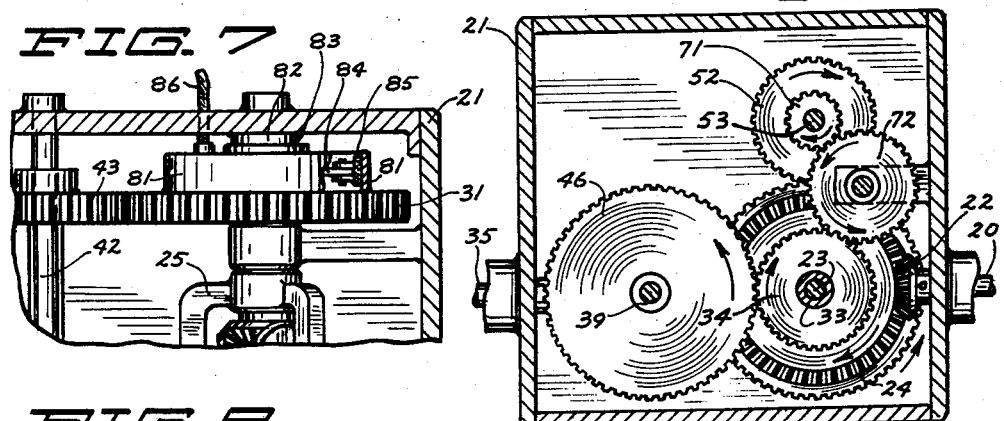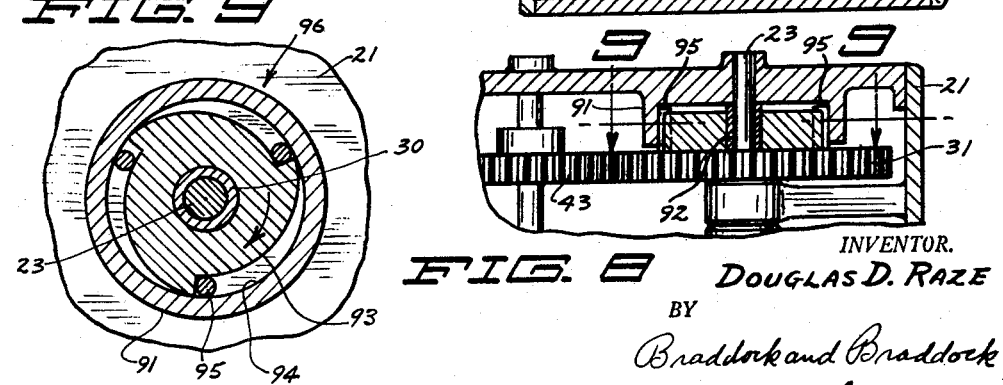

United States Patent Office 3,119,282
Patented Jan. 28, 1964

3,119,282
VARIABLE SPEED POWER TRANSMISSION
Douglas D. Raze, Minneapolis, Minn.
Continuation of application Ser. No. 576,378, Apr. 5, 1956. This application Jan. 31, 1961, Ser. No. 86,207
8 Claims. (Cl. 74—687)

This invention has relation to variable speed power transmissions and more particularly to such transmissions in which power is delivered to the transmission along a drive shaft and is taken from the transmission along a driven shaft and in which the ratio of the speed of the driven shaft to that of the drive shaft can be varied through an infinite number of increments from stationary to high speed with respect to said drive shaft. In certain forms of the invention, the ratio of the speed of the driven shaft to the speed of the drive shaft will be a function of the power available at the drive shaft and the resistance offered at the driven shaft.

To obtain this change of ratio in a transmission, a first set of planetary gears is driven by a drive shaft and a second set of planetary gears drives a driven shaft. A separate pair of opposed pinion gears are each one in meshing relationship with one set of the planetary gears and one of a pair of gear trains connects each of said pinion gears to a corresponding pinion gear in meshing relationship to the opposite planetary gear. The ratio of the speed of the driven shaft to the speed of the drive shaft can be controlled by controlling the speed of the gear trains with respect to each other. This can be done by applying a drag or braking action to one or the other of the gear trains, by applying the power of one train to the other train, or by adding power to one or both of the trains from an outside source.

This application is a continuation of my former and co-pending application, Serial No. 576,378, now abandoned, filed by me April 5, 1956, and entitled "Variable Speed Power Transmission."

A power transmission made according to the present invention includes a drive shaft which is positively geared to rotate a primary ring gear which supports primary planetary gears, a first primary pinion gear meshed with said planetary gears and fixedly mounted on a first primary axle, a second oppositely disposed primary pinion gear meshed with said planetary gears at an opposite side of said first primary pinion gear and fixedly mounted on a second primary axle having an axis coincident with the axis of said first primary axle, a first primary gear wheel fixedly mounted on said first primary axle and a second primary gear wheel fixedly mounted on said secondary primary axle, a driven shaft which is positively geared to rotate with the rotation of a secondary ring gear which supports secondary planetary gears, a first secondary pinion gear meshed with said planetary gears and fixed to rotate on a first secondary axle, a second oppositely disposed secondary pinion gear meshed with said secondary planetary gears at an opposite side thereof from said first secondary pinion gear and fixedly mounted on a second secondary axis to rotate therewith, a first secondary gear wheel fixedly mounted with respect to said first secondary axle and a second secondary gear wheel fixedly mounted with respect to said second secondary axle, said first primary gear wheel and said first secondary gear wheel being operably connected to each other to form a first gear train and said second primary gear wheel and said second secondary gear wheel being operably connected to each other to form a second gear train.

The ratio of the speed of the driven shaft to that of the drive shaft can be varied by controlling the speed of the first gear train with respect to the speed of the second gear train. This can be accomplished in any one of a number of ways including applying an external drag or braking effect or holding effect to one or the other or both of the gear trains, by positively controlling the speed of one of the gear trains to have a definite fixed relationship to the speed of the other gear train through the use of auxiliary gearing between the two trains, by influencing the speed of one of the trains with the other train through the use of auxiliary gearing or connections and adjustable clutching means or by driving one or both of the trains from an external power source.

Figure 4:
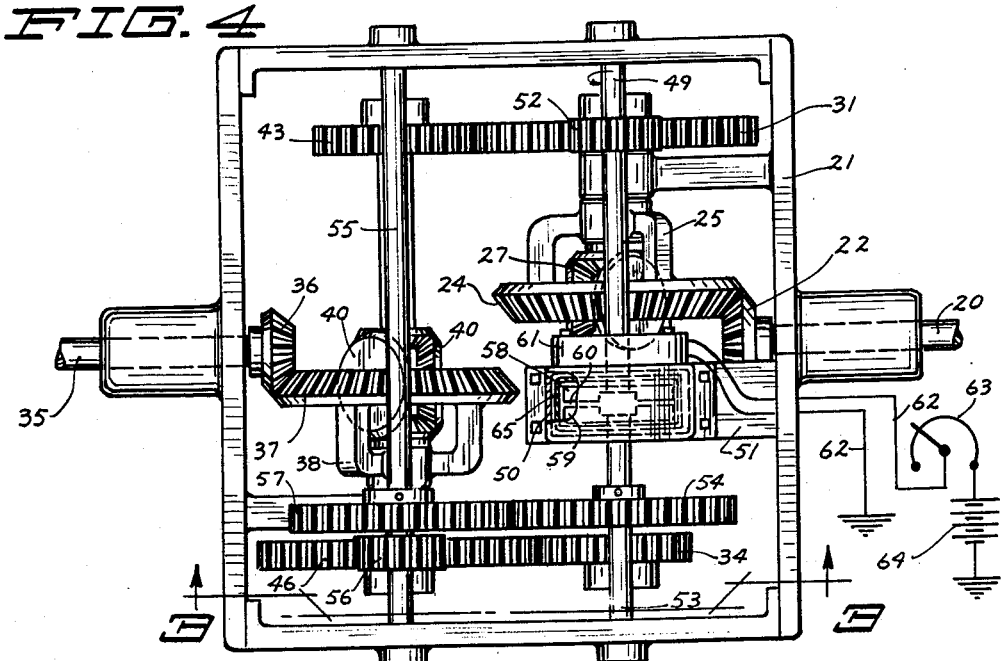

In the drawings,
FIG. 1 is a horizontal sectional view of the arrangement of the power transmitting gears of the present invention as on line 1—1 in FIG. 3 with parts in section and parts broken away;
FIG. 2 is a sectional view taken on the line 2—2 in FIG. 1;
FIG. 3 is a reduced vertical sectional view taken on the line 3—3 in FIG. 4 showing a first form of the invention;
FIG. 4 is a top plan view of the first form of the invention;
FIG. 5 is a top plan view of a power transmission made according to a second form of the invention;
FIG. 6 is a reduced vertical sectional view taken on line 3—3 in FIG. 1 but disclosing the second form of the invention;
FIG. 7 is a fragmentary, horizontal sectional view of a portion of a power transmission as seen in the upper right hand corner of FIG. 1 but at a reduced scale and disclosing a third form of the invention;
FIG. 8 is a fragmentary, horizontal sectional view of a power transmission as seen in the upper right hand corner of FIG. 1 but at a reduced scale and disclosing a fourth form of the invention; and
FIG. 9 is an enlarged vertical sectional view taken on the line 9—9 in FIG. 8.

Referring to the drawings and the numerals of reference thereon, a drive shaft 20 is rotatably supported in a gear box 21 and a drive shaft bevel gear 22 is fixedly mounted on said drive shaft to rotate therewith. A primary shaft 23 extends through the gear box 21 and is fixedly positioned with respect thereto. A primary bevel ring gear 24 having a spider 25 extending outwardly therefrom is rotatably mounted with respect to said primary shaft 23 as at 26. A plurality of primary planetary gears 27 (three as shown) are each rotatably supported with respect to the primary ring gear 24 by means of stub shaft 28. A first primary bevel pinion gear 29 is in meshing relationship to each of the planetary gears 27 and is fixedly mounted on a first primary axle 30 which is rotatably mounted with respect to primary shaft 23. A first primary gear wheel 31 is fixedly mounted on the first primary axle 30 to rotate therewith.

A second primary beveled gear 32 is in meshing relationship to each of the planetary gears 27 and is fixedly mounted on a second primary axle 33 to rotate with respect to the primary shaft 23. A second primary gear wheel 34 is also fixedly mounted on the second primary axle 33 to rotate therewith.

A driven shaft 35 is also rotatably mounted with respect to the gear box 21 and a driven shaft bevel gear 36 is fixedly mounted thereon to be in engaged relationship with a secondary bevel ring gear 37 having a spider 38 integrally connected thereto. A secondary shaft 39 extends from one side of the gear box 21 to the other and is fixedly mounted with respect thereto. The secondary ring gear 37 is rotatably supported with respect to said secondary shaft 39 through the instrumentality of the spider 38. A plurality of secondary planetary gears 40 are each rotatably supported with respect to said secondary ring gear 37.

A first secondary bevel pinion gear 41 is fixedly mounted on a first secondary axle 42 to rotate with respect to the secondary shaft 39. A first secondary gear wheel 43 is also fixedly mounted on said first secondary axle 42 to rotate therewith.

A second secondary beveled pinion gear 44 is fixedly mounted on a second secondary axle 45 to rotate with respect to said secondary shaft 39. A second secondary gear wheel 46 is likewise fixedly mounted on the second secondary axle 45 to rotate therewith.

As disclosed, the first primary gear wheel 31 and the first secondary gear wheel 43 are positively meshed with each other. Since these gears are positively meshed to each other, the rotational speed of one with respect to the other is fixed and for convenience these two gear wheels will be referred to jointly as the first gear train 47.

Likewise, the second primary gear wheel 34 and the second secondary gear wheel 46 are positively meshed together and for convenience will be referred to jointly as the second gear train 48.

As disclosed, the first primary gear wheel 31 has a pitch diameter three times the first secondary gear wheel 43 and the second primary gear wheel 34 has a pitch diameter equal to one third of that of the second secondary gear wheel 46. These ratios of the diameters of the primary gear wheels to those of the secondary gear wheels are merely illustrative, it being understood that any other ratios may be used to obtain a desired result as long as at least one of the gear wheels rotatable on at least one of the shafts 23 and 39 has a different pitch diameter to the other gear wheel on the same shaft.

While the ratio of the pitch diameter of the first primary gear wheel to the first secondary gear wheel is disclosed as being equal to the ratio of the pitch diameter of the second secondary gear wheel to the second primary gear wheel, it is to be understood that through the use of any simple expedient such as a chain drive or idler gears, these ratios need not be maintained.

The basic power transmitting arrangement as disclosed in FIGS. 1 and 2 and as just described will form a basis for the four different forms of the invention disclosed in FIGS. 3 through 6. It is to be understood, however, that while a certain arrangement of gearing has been shown for purposes of illustration, the actual disclosure of FIGS. 1 and 2 could be modified considerably without departure from the spirit of the invention and the scope of the claims which follow.

In order to vary the speed of rotation of the driven shaft 35 with respect to the speed of rotation of the drive shaft 20, it is necessary that the speed of the first gear train 47 be controlled with respect to that of the second gear train 48. This is another way of saying that the speed of rotation of either the first primary pinion gear 29 or the second primary pinion gear 32 must be controlled with respect to the speed of rotation of either the second primary pinion gear 32 or the second secondary pinion gear 44. There are a number of ways of effecting such control and four of such will now be described in connection with four different forms of the present invention. It is to be understood that there may be many other possible means of control which have not been disclosed in the drawings or described specifically herein but which will come within the spirit of the invention and the scope of the claims.

Referring now particularly to FIGS. 1 and 2 and FIGS. 3 and 4, in a first form of the invention, a first primary upper shaft 49 is rotatably mounted in the gear box 21 and a clutch housing 50 which clutch housing is in turn mounted on a pedestal 51 on said gear box. A first primary control gear 52 is mounted to rotate with the first primary upper shaft 49 and to be in meshing relationship to first primary gear wheel 31. A second primary upper shaft 53 is rotatably mounted in gear box 21 and in the clutch housing 50. A second primary control gear 54 is fixedly mounted on said second primary upper shaft 53 to rotate therewith. A secondary control shaft 55 is rotatably mounted in the gear box 21 and a first secondary control gear 56 is mounted to rotate therewith and to be in meshing relationship with the second secondary gear wheel 46. A second secondary control gear 57 is also rotatably mounted with said secondary control shaft 55 and is in meshing relation with a second primary control gear 54 which is mounted to rotate with the second primary upper shaft 53.

As clearly disclosed in FIG. 4, the first primary control shaft 49 and the second primary control shaft 53 are rotatably mounted on the same axis. A control mechanism connected to said control shafts 49 and 53 is comprised of a plurality of first control vanes 58 fixedly mounted on first primary control shaft 49 inside of clutch housing 50 and a plurality of second control vanes 59 fixedly mounted on second primary control shaft 53 inside of said clutch housing. A clutch casing 65 surrounds the vanes and is freely rotatably on shafts 49 and 53. The control shafts, control vanes, clutch casing and clutch housing form the elements of a conventional fluid drive or clutch with a hydraulic fluid 60 inside said casing.

As is the case with all such fluid drives or clutches, the rotational movement of the first control vanes 58 will have an effect upon and will transmit power to the second control vanes 59 and rotational movement of the second control vane 59 will have an effect upon and will transmit power to the first control vane 58 in proportion to the viscosity of the control fluid 60 and to the speed and direction of rotation of the control vanes with respect to each other.

If the direction of rotation of the drive shaft 20 is such as to cause the primary bevel ring gear 24 to rotate in a positive or clockwise direction as seen in FIG. 3, and the driven shaft 35 is standing still, and if the ratio of pitch diameter of the first primary gear wheel 31 to the second primary gear wheel 34 is three to one and the ratio of the pitch diameter of the first secondary gear wheel 43 to the second secondary gear wheel 46 is one to three, the following motion will be taking place. The first primary gear wheel 31 will be rotating in a negative or counterclockwise direction at one revolution for every four positive revolutions of the primary bevel ring gear 24. At the same time, the second primary gear wheel 34 will be rotating in a positive direction for a total of 9 revolutions. Since this second primary wheel 34 is only one third of the diameter of the second secondary gear wheel 46 and since it is in meshing relationship therewith, the second secondary gear wheel 46 will have turned a total of three revolutions in a negative direction, being three times as large as the first secondary gear wheel 43 and being in meshing relationship thereto, the single negative revolution of the first primary gear wheel 31 will account for three positive revolutions of said first secondary gear wheel 43. This means that there have been three positive revolutions of the first secondary beveled pinion gear 41 and 3 negative revolutions of the second secondary bevel pinion gear 44. Obviously the secondary planetary gears 40 with which the secondary bevel pinion gears are meshed have simply rotated on their axes and these axes have not moved in the plane of their planetary action. Consequently the second beveled ring gear 37 and the driven shaft 35 have not moved.

As long as the relationship of the movement of the first gear train to the second gear train remains, as has just been described, there will be no movement of the driven shaft 35. As soon as there is any influence which will cause a change of the relationship between the speeds of the first gear train and the second gear train, there will not be an equal and opposite rotation of the secondary bevel pinion gears 41 and 44 and movement of the driven shaft 35 must result.

Referring again to FIG. 3, it will be seen that the negative movement of second secondary gear wheel 46 will cause a positive movement of first secondary control gear 56 with which it is intermeshed. This positive movement is transmitted through the secondary control shaft 55 to the second secondary control gear 57 which is in turn meshed with second primary control gear 54 and imparts a negative movement thereto. The single negative revolution of the first primary gear wheel 31 will impart a positive movement to the first primary control gear 52 with which it is intermeshed. This positive movement will be transmitted to the control vanes 58 through the instrumentality of the first primary control shaft 49. Since the negative rotation of the second primary control gear is imparted to the second control vanes 59 through the instrumentality of the second primary control shaft 53, when the driven shaft 35 is not rotating the control vanes 58 and 59 will be rotating in opposite directions with respect to each other. Each of these sets of control vanes will tend to effect a change in the speed of rotation of the other set of vanes. If the speed of rotation of the drive shaft 20 is comparatively slow, and if the driven shaft 35 is connected to any considerable load, there will not be sufficient power transmitted between the two sets of vanes to overcome this friction load and the relative speed of rotation of the parts with respect to each other will be as previously described and consequently, the driven shaft will not turn. This would be the situation if the power transmission of the first form of the invention was installed in an automobile, for example. That is, if the driven shaft 35 extended to the drive wheels of an automobile and the drive shaft 20 was the drive shaft of an automobile engine, the wheels of the automobile would not turn as long as the engine was idling.

When, however, the speed of the engine is increased, the relative speed of rotation of the first control vanes 58 with respect to the second control vanes 59 will be increased. At some point, depending upon the viscosity of the fluid in the fluid clutching mechanism, there will be a sufficient transmission of power between the first and second control vanes so that the frictional load on the driven shaft 35 will be overcome and the driven shaft will begin to rotate.

Since the control vanes are rotating in opposite directions when the driven shaft is standing still, the power transmitted across the vanes will tend to cause both the first and second gear trains to make less revolutions per revolution of the drive shaft.

An analysis of the gearing will reveal that if the first gear train were stopped, a positive rotation of the primary ring gear 24 would result in a negative rotation of the secondary ring gear 37 and, of course, all of the drive would be through the second gear train. Since as disclosed the ratio of the diameter of the second primary gear wheel to the second secondary gear wheel is 1 to 3, the driven shaft 35 would turn at one third of the speed of the drive shaft 20 with a corresponding increase in power. For the purpose of this analysis, in connection with this first form of the invention, it will be assumed that this clockwise or positive rotation of the primary ring gear 24 resulting in the negative or counter-clockwise rotation of the secondary ring gear 37 as seen in FIG. 3 will cause the driven shaft 35 to move the work to which it transmits power in a forward direction.

When the driven shaft 35 is stationary and no power is transmitted, the first primary gear wheel 31 is rotating in a negative or counter-clockwise direction. But, as just seen, if this wheel 31 were standing still, a power increase of from 1 to 3 and a speed reduction of from 3 to 1 would occur.

At the point where the power transmission across the control vanes 58 and 59 is sufficient to cause any change whatsoever in the speed of either or both of the gear trains, movement in the driven shaft 35 must take place to drive the work in a forward direction. The gear ratio of the power transmitting gears at this point will be infinitesimally low. It is to be noted that there is no necessity to cause either of the vanes to rotate in the same direction as the other. It is only necessary that the frictional drag between the vanes be enough to cause a change in speed of the gear trains. At this point the first and second gear trains will no longer be operating in precisely the same speed ratio with respect to each other and movement of the driven shaft in a very low gear ratio will result. As more and more power is transmitted between the two sets of control vanes, as, for example when the drive shaft is considerably speeded up, a point will be reached where the slower moving first control vanes 58 will come to a standstill with respect to the clutch housing. At this point the power will all be transmitted through the second gear train 48 and a speed reduction from 3 to 1 and a power increase from 1 to 3 will be in effect between the drive and driven shafts. As more power is transmitted across the fluid clutch, the vanes will begin moving in the same direction and a point will eventually be reached where the vanes are traveling at the same speed. Depending upon the gear ratios of the control gears, this will result in a predetermined high gear situation between the drive shaft 20 and the driven shaft 35. When the fluid clutch is operative to have both sets of vanes moving at the same speed, the highest gear ratio possible in this first form of the invention has been reached.

The power transmission between the first control vanes 58 and the second control vanes 59 is a function of the speed of rotation of these vanes with respect to each other and the viscosity of the fluid in the clutch housing as previously indicated. Power transmission between the vanes can be increased by increasing the speed of the drive shaft 20 as indicated. Increase in the viscosity of the fluid will also cause an increase in power. Here use can be made of the magnetic clutch principle. The magnetic coil 61 is connected by wires 62 to an appropriate rheostat 63 and power source 64. When a higher gear ratio between the drive and driven shafts is desired, the viscosity of the fluid 60 can be increased by increasing the electrical energy to the coil 61. The nature of the magnetic clutch is such that the magnetic coil can be energized to a point where the fluid 60 will become rigid and the vanes 58 and 59 will be fixed in their relationship to each other.

As previously explained, an advantage of the present mechanism is the fact that the power transmission will automatically adjust itself in gear ratio as may become necessary. For any particular viscosity of oil in the fluid clutch mechanism, an equilibrium will be established when the power input of the drive shaft 20 is maintained at a constant level and the resistance to turning at the driven shaft 35 remains constant. Under these conditions, the amount of power transmitted across the fluid clutch will be constant and the gear ratio will remain constant. Now suppose the resistance at the driven shaft 35 is suddenly increased, as, for example, when an automotive vehicle utilizing the device suddenly started to climb a hill. This resistance at the ring gear 37 will cause the first primary gear wheel 31 to have increased tendency to rotate in a negative direction and will cause second primary gear wheel 34 to have increased tendency to rotate in the positive direction. The relationship between the speed of the first control vanes 58 to the second control vanes 59 will be changed accordingly and the relative speed of one with respect to the other will be increased. This results in the operation of the power transmission in a lower gear ratio.

A sudden addition to the power available at the drive shaft 20 has the same result. This sudden increase in power at ring gear 24 likewise tends to increase the tendency of the first primary gear wheel 31 to rotate in a negative direction and to increase the tendency of the second primary gear wheel 34 to rotate in a positive direction and this change in conditions will also cause an increase of the slippage of the first and second control vanes with respect to each other and a lowering in the gear ratio. The overall increase in the speed of the control vanes due to increase in power input, however, will result in an increase in the amount of power transferred through the fluid clutch and as the power transmission adjusts to the increase in power supplied to the drive shaft 20, a new point of equilibrium will be reached with this gear ratio higher and the speed of the driven shaft 35 is also higher.

Referring now to FIGS. 1 and 2 and FIGS. 5 and 6, in a second form of the invention a first primary control shaft 49 is rotatably mounted in the gear box 21 and in a clutch housing 50 as was the case in connection with the first form of the invention. Likewise, a first primary control gear 52 is situated in meshing relationship to first primary gear wheel 31. A second primary control shaft 53 is rotatably mounted in the gear box 21 and in the clutch housing 50. A second primary control gear 71 is mounted to rotate with a second primary control shaft 53 but is situated in clearing relationship to second primary gear wheel 34. An idler gear 72 is rotatably mounted with respect to gear box 21 and is situated to be in meshing relationship with both second primary control gear 61 and second primary gear wheel 34.

Referring now to FIG. 6 as in the previous analysis a positive or clockwise rotation of the primary bevel ring gear 24 will cause a positive rotation of the second primary gear wheel 34 and a negative rotation of the first primary gear wheel 31 when the driven shaft 35 is not moving. Again, this is the situation when the engine driving the drive shaft 20 is idling and the frictional or other load on the driven shaft is appreciable. But now this positive rotation of the second primary gear wheel 34 will cause a negative rotation of idler gear 72 and a positive rotation of second primary control gears 71. However, as previously explained, the negative rotation of the first primary gear wheel 31 as seen in FIG. 6 is causing a positive rotation of the first primary control gear 52. As in the case with the first form of the invention, first control vanes 58 are provided on the end of the first primary control shaft 49 and inside of the clutch housing and casing and second control vanes 59 are provided on the end of the second primary control shaft 53 and inside of the housing 50 and the casing 65. As explained in connection with the first form of the invention, in order that the driven shaft 35 remain stationary, the ratio of the speed of rotation of the first gear train with respect to that of the second gear train must remain exactly fixed. Now, however, the first control vanes 58 are rotating in the same direction as the second control vanes 59 but at different speeds. In the embodiment of the invention disclosed herein, the second control vanes 59 are traveling at a faster rate than are the first control vanes 58 when the driven shaft 35 is not moving.

As previously analyzed, the positive rotation of second primary gear wheel 34 which now also causes the second control vane 59 to move in a positive direction tends to cause the secondary bevel ring gear 37 to be rotated in a negative or counter-clockwise direction. This positive rotation of second primary gear wheel 34 will tend to be slowed down by the action of the first control vanes 58 on the second control vanes 59; and the tendency for the secondary bevel ring gear 37 to be moved in a negative direction by second gear train 48 will be reduced as said second gear train 48 is slowed down.

Since the driven shaft 35 is standing still under idling conditions and since the action of the power transmitted through the second gear train was to cause secondary bevel ring gear 37 to move with a negative rotation, it is obvious that the power transmitted through the first gear train 47 is tending to cause the ring gear to have a positive rotation. In other words, a negative rotation of the first primary gear wheel 31 acting through the first secondary gear wheel 43 tends to cause the secondary bevel ring gear 37 to rotate in a positive direction. But the action of the second control vanes 59 on the first control vanes 58 will tend to cause the relative speed of the negative rotation of first primary gear wheel 31 to be increased. This increase in relative speed of negative rotation of the first primary gear wheel 31 will increase the tendency of the secondary bevel ring gear 37 to rotate in a positive direction. Thus it will be seen that both the action of the first control vanes 58 speeding up and the control vanes 59 slowing down as the power transmitted between these vanes is increased will tend to cause the secondary ring gear 37 to increase its rotation in a positive direction. For the purpose of the analysis of the second form of the invention, therefore, rotation of the secondary ring gear 37 in a positive direction will be assumed to cause the driven shaft 35 to be moved to drive the load or perform the work in a forward direction.

As soon as there is sufficient power transmitted between the control vanes 58 and 59 to cause change in the relative speed of the first gear train with respect to the second gear train 48, the driven shaft 35 will drive the work in a forward direction. This will happen as soon as the power transmitted between the vanes overcomes the frictional load tending to hold the driven shaft 35 at rest. As the power transfer in the fluid clutch is further increased, the speed of the second control vanes will be further retarded and the speed of the first control vanes 58 will be further increased. This will result in an increase in the speed of rotation of the driven shaft 35 with respect to the drive shaft 20. In other words, an increasingly high gear ratio will result from an increase in power transfer between the clutch vanes.

If the relationship between the diameters of the first primary control gear 52 and the first primary gear wheel 31 are such that the first primary control shaft 49 rotates twice to every revolution of the first primary axle 30; and if the pitch diameter of the second primary control gear 71 and the second primary gear wheel 34 are such that the second primary control shaft 53 rotates twice for every rotation of the second primary axle 33, then if a point could ever be reached where first control vanes 58 and second control vanes 59 became locked with respect to each other, the first primary axle 30 would be rotating exactly the same number of times as the second primary axle 33 but in an opposite direction. Obviously this could only happen when the primary bevel ring gear 24 was stationary so that the primary planetary gears 27 would be rotating with the first primary bevel pinion gear 29 and the second primary bevel pinion gear 32 without movement of the axes of the planetary gears in their planetary orbits.

From the above analysis it will be seen that as the power at drive shaft 20 is increased, and as the power transmitted between the first and second control vanes of the fluid clutch is increased, the speed of the control vanes with respect to each other will be decreased and the gear ratio will be increased. There is no limit to the increase in the gear ratio except the limit of the amount of power which can be transmitted through the fluid clutch and the amount of power which can be supplied to the drive shaft 20.

In other words, the relative speed of the driven shaft 35 with respect to the drive shaft 20 will keep increasing as the power at the drive shaft is increased and the power transmitted across the fluid clutch is increased until the resistance of the driven shaft 35 and the friction losses in the apparatus are equal to the power input at the drive shaft 20.

As stated in connection with the first form of the invention, a magnetic fluid clutch can be utilized to increase and decrease at will the viscosity of the fluid 60 between the vanes and consequently increase and decrease the power transmitted between the vanes.

Referring now to FIGS. 1 and 2 and FIG. 7, in a third form of the invention the portion of the power transmission seen at the upper right hand corner of 31 is modified to appear as in FIG. 7. The first primary gear wheel 31 is provided with an outwardly extending annular brake drum 81 integral therewith. An inwardly extending hub 82 in which the primary shaft 23 is journaled is provided with an annular flange 83 on which there is supported hydraulic brake mechanism of any usual or preferred construction including a brake arm and a brake shoe 85. A pipe 86 is for carrying hydraulic fluid for exerting pressure on the braking mechanism to cause the brake shoe 85 to be brought into braking contact with the interior surface of the brake drum 81.

As has been explained in connection with the other forms of the invention, when the driven shaft 35 is at rest and the drive shaft 20 is rotating, there will be a fixed relationship between the speed of the first gear train 47 and the second gear train 48. Any means of changing the relationship of the speeds of these gear trains to each other will result in movement of the driven shaft 35. The brake disclosed in FIG. 7 can provide such a change in this relationship. When hydraulic pressure is exerted through the pipe 86 from a source (not shown) so that the brake shoe 85 is brought to bear on the brake drum 81, the first primary gear wheel 31 will tend to slow down. As soon as this gear wheel 31 slows down in relationship to the movement of the second primary gear wheel 34 for example, movement will take place in the driven shaft 35. The initial movement taking place will be at an extremely low gear ratio.

As further pressure is brought to bear on the brake drum 81, the first primary gear wheel 31 will eventually come to rest and be held in that condition. At this time all of the drive through the transmission will be through the second gear train. Since, as disclosed, the ratio of the pitch diameter of the second primary gear wheel 34 to the second secondary gear wheel 46 is one to three, the driven shaft 35 will be turning at ⅓ of the speed of the drive shaft 20 and will have three times the power of the drive shaft less friction losses in the transmission. When a power transmission made according to a third form of the invention is applied to an automobile or a truck, it is obvious that when a braking mechanism of FIG. 7 is applied to hold the first primary gear wheel 31 and consequently the first gear train in fixed position with relation to the gear box, a positive low gear drive through the second gear train 48 results.

Obviously, any other convenient or desirable gear ratio of the first gear train and/or the second gear train could be used to provide for a positive drive to the second gear train. Also, it will be obvious that the braking arrangement disclosed in FIG. 7 could be applied equally well to the second secondary gear wheel 46 and that when this gear wheel was locked in fixed position with respect to the gear box 21, a positive drive through the first gear train would result in which, as disclosed herein, the driven shaft 35 would turn at three times the speed of the drive shaft 20 and the power available would be one third of that available at the drive shaft 20 less friction losses in the power transmission.

Referring now to FIGS. 1 and 2 and FIGS. 8 and 9, in a first form of the invention, the structure disclosed in the upper right hand corner of FIG. 1 could be modified to be as disclosed in FIGS. 8 and 9. An annular drum extends outwardly from the gear box 21 in concentric relationship to the primary shaft 23. A boss 92 is integral with and extends outwardly from first primary gear wheel 31 and includes tapered locking surfaces 93 parallel to the axis of rotation of said gear wheel and driving surfaces 94 lying in planes passing through the axis of said gear wheel. A plurality of cylindrical pins 95 are situated in the space provided between the tapered locking surfaces 93 and the interior surface of the annular drum 91. This whole arrangement is denoted generally as anti-backup mechanism 96.

As set out in connection with the first form of the invention, when the driven shaft 35 is at rest, and the drive shaft 20 is rotating, first primary gear wheel 31 must rotate in a negative direction as seen from the bottom of FIG. 1. Since section line 9—9 is taken from the opposite direction, this same movement will appear as a positive or clockwise movement in FIG. 9. But the cylindrical pins 95 and the tapered locking surfaces 93 of the boss 92 are so situated that as the gear wheel 31 and consequently the boss 92 attempts to rotate in a positive direction as seen in FIG. 9, these pins 95 will become wedged between the locking surfaces 93 and the interior surface of the annular drum 91 and the gear wheel 31 will be unable to rotate. As explained in connection with the third form of the invention, this locking of gear wheel 31 and consequently the first gear train 47 will result in a positive drive entirely through the second gear train 48. As disclosed this means that three times the power available at the drive shaft 20 less the friction losses in the power transmission will be available at the driven shaft 35 at one third of the speed of the drive shaft. This will then be the lowest gear ratio of which the power transmission made according to the fourth form of the invention is capable of delivering. As the power developed at the drive shaft 20 is increased and as the load on the drive shaft 35 is decreased, the powered transmission will move into a higher gear ratio and the first primary gear wheel 31 will be free to rotate in a negative or counter-clockwise direction as seen in FIG. 9.

This movement to a higher gear ratio can be obtained by providing a brake such as disclosed in the third form of the invention on the action of the second gear train or by some such means as disclosed in the first and second forms of the invention.

The anti-backup mechanism 96 can also be used to limit the highest gear ratio which will be delivered by the power transmission. In order to do this, the boss 92 would be constructed to have the tapered locking surfaces 93 in reverse relationship to that shown in FIG. 9. The gear wheel 31 would then be free to turn in the negative or counter-clockwise direction as seen in FIG. 9 and would be prevented from turning in the positive direction. Then when some means such as disclosed in the first three forms of the invention or some other means was used to vary the relationship of the speed of the gear trains with respect to each other, the driven shaft 35 would initially move at an extremely low gear ratio. As the ratio of the speed of the gear trains to each other was changed further, the overall gear ratio of the power transmission would get higher until a point was reached where the gear wheel 31 would come to a stop. At this point the drive would be entirely through the second gear train and the overall gear ratio from the drive shaft to the driven shaft would be such that the power available at the driven shaft would be three times that available at the drive shaft less losses. Since the anti-backup mechanism 96 would now prevent the gear 31 and the boss 92 from rotating in a negative direction as seen in FIG. 9 (positive direction as seen in FIG. 1), the gear ratio delivered by the power transmission could never be any higher than 1 to 3. This could be useful where the gear transmission was employed on tractors, hoisting mechanisms, or the like.

In order to limit the output of a power transmission as herein disclosed to a low gear of from 1 to 3 and to a high gear of 3 to 1, the anti-backup mechanism 96 will be installed as disclosed in FIG. 9 and a similar mechanism will be installed in relationship to the second gear train to prevent rotation of second secondary gear wheel 46 in a positive direction as seen from the bottom of FIG. 1.

As heretofore stated, the basic concept of this invention is the provision of a positive gear transmission in which the power transmitting gears are always in mesh with each other and in which the ratio of the speed of these power transmitting gears to each other can be varied to vary the overall gear ratio of the power transmission. While the various means of varying the ratios of the power transmitting gear trains to each other disclosed herein are believed to be inventive, it is to be understood that numerous other means could be utilized to accomplish the same purpose. For example, in the first form of the invention, a friction clutch could replace the fluid clutch mechanism and the control gearing could be completely rearranged. Likewise, in connection with the third form of the invention, the brake mechanism disclosed could be, under some circumstances replaced by a locking mechanism through the instrumentality of which the primary gear wheel 31 could be locked against movement. Any combination of the control mechanisms disclosed could be utilized in a single power transmission and provision could be made for the various mechanisms to be operative in the system at certain times and inoperative at other times.

What is claimed is:

1. A power transmission including a gear box, a drive shaft rotatably mounted in said gear box, a driven shaft rotatably mounted in said gear box, a primary ring gear rotatably mounted to be driven by said drive shaft, a secondary ring gear rotatably mounted to drive said driven shaft, a primary planetary gear mounted to revolve with said primary ring gear and to have its axis radially aligned with the axis of rotation of said primary ring gear, first and second primary pinion gears rotatably mounted on said axis of said primary ring gear and in meshing relationship with said primary planetary gear, a secondary planetary gear mounted to revolve with said secondary ring gear and to have its axis radially aligned with the axis of rotation of said secondary ring gear, first and second secondary pinion gears rotatably mounted on said axis of said secondary ring gear and in meshing relationship with said secondary planetary gear, a first gear train operably connected to said first primary pinion gear and said first secondary pinion gear to cause said first and second primary pinion gears to rotate with respect to each other in a predetermined gear ratio relationship and a second gear train operably connected with said second primary pinion gear and with said second secondary pinion gear to cause said second primary and said second secondary pinion gears to rotate with respect to each other in a predetermined gear ratio different from said first predetermined ratio, and control means controlling the speed of said first and second gear trains with respect to each other constituted as a first control shaft drivably connected to said first gear train and mounted to rotate in response to rotation of said first gear train, a second control shaft drivably connected to said second gear train and mounted to rotate in response to the rotation of said second gear train and means connected to said control shafts for transmitting rotative power therebetween.

2. In combination with a source of power, a power transmission consisting of a base member, a primary differential mechanism mounted with respect to said base member and having an input member receiving power from said outside source and first and second primary axles each operably connected with said input member and each drivably connected to and transmitting power flowing through said primary differential mechanism, a secondary differential mechanism mounted with respect to said base member and having an output member transmitting power from said secondary differential mechanism and first and second secondary axles each operably connected with said output member and each drivably connected to and transmitting power flowing through said secondary differential mechanism, first means drivably connecting and causing said first secondary axle to rotate in response to rotation of said first primary axle, second means drivably connecting and causing said second secondary axle to rotate in response to rotation of said second primary axle, and control means other than said differential mechanisms operably connected to and transmitting power between said first axles and said second axles, said control means being connected to said first and said second means and including a mechanism controlling the amount of power transmitted between said first axles and said second axles in response to the relative speed of rotation of said first axles with respect to the speed of rotation of said second axles.

3. In combination with a source of power, a power transmission consisting of a journal structure, a primary differential mechanism mounted with respect to said journal structure and having an input member receiving power from said outside source and first and second primary axles each operably connected with said input member and each drivably connected to and transmitting power flowing through said primary differential mechanism, a secondary differential mechanism mounted with respect to said journal structure and having an output member transmitting power from said secondary differential mechanism and first and second secondary axles each operably connected with said output member and each drivably connected to and transmitting power flowing through said secondary differential mechanism, first drive means drivably connecting said first secondary axle and said first primary axle and causing said first secondary axle to rotate at a fixed ratio in response to rotation of said first primary axle, second drive means drivably connecting said second secondary axle and said second primary axle and causing said second secondary axle to rotate at a different ratio in response to rotation of said second primary axle, and control means other than said differential mechanisms transmitting power between said first axles and said second axles, said control means being connected to said first and second drive means and including a mechanism controlling the amount of power transmitted between said first axles and said second axles in response to relative speeds of said input member and said output member.

4. A variable speed power transmission comprising, a frame including journal structure, a source of rotary power, a primary differential mechanism mounted upon said journal structure, an input member connected with said source of rotary power in driven relation and connected with said differential mechanism in driving relation, first and second primary axles each operably connected with said primary differential mechanism for transmitting power flowing through said primary differential mechanism, a secondary differential mechanism mounted upon said journal structure, first and second secondary axles operably connected to said secondary differential mechanism and transmitting power flowing through said secondary differential mechanism, a driven rotary member connected in driven relation with said secondary differential mechanism, first drive means connected to said first primary axle and said first secondary axle in driving relation and causing said first secondary axle to rotate at a predetermined ratio in response to rotation of said first primary axle, second drive means connected to said second secondary axle and said second primary axle in driving relation and causing said second secondary axle to rotate at a predetermined and different ratio in response to rotation of said second primary axle, and control means extending between, and operatively connected with said first and second drive means and including control mechanism and shaft means drivably connecting said control mechanism to both of said drive means for constantly transmitting rotative power from one of said drive means to the other of said drive means in response to relative speed of rotation of said first drive means with respect to the speed of rotation of said second drive means.

5. The structure defined in claim 4 wherein said control mechanism includes a fluid clutch.

6. The structure defined in claim 5 wherein the said fluid clutch includes a viscous liquid, and means connected to said fluid clutch for varying the viscosity of said liquid.

7. The structure defined in claim 4 wherein said shaft means includes a pair of axially aligned control shafts connected to each other by said control mechanism.

8. The structure defined in claim 4 wherein said control mechanism includes a fluid clutch and said shaft means includes a pair of axially aligned shafts each of which is drivably connected at one of its ends to said fluid clutch and to one of said drive means at its other end.

References Cited in the file of this patent

UNITED STATES PATENTS

| | | |
|---|---|---|
| 2,117,340 | Maurer | May 17, 1938 |
| 2,181,118 | Burner | Nov. 28, 1939 |
| 2,464,275 | Trofimov | Mar. 15, 1949 |
| 2,480,032 | Kochis | Aug. 23, 1949 |
| 2,924,122 | Foster | Feb. 9, 1960 |

FOREIGN PATENTS

| | | |
|---|---|---|
| 538,645 | Italy | Jan. 28, 1956 |